3,153,013
ORGANIC DIISOCYANATES REACTED WITH A PHOSPHONIC ACID

Charles H. Campbell, Crestwood, Mo., assignor, by mesne assignments, to Monsanto Company, a corporation of Delaware
No Drawing. Filed Jan. 6, 1961, Ser. No. 80,974
3 Claims. (Cl. 260—77.5)

This invention relates to a new class of synthetic linear polymers and more particularly to synthetic linear polymers having recurring structural units which contain phosphorus and nitrogen.

This invention has as an object to provide linear polymers derived from diisocyanates and organo-phosphonic acids which can be formed into fibers, filaments, films, coatings and other useful materials.

It is another object of this invention to provide a method for the preparation of a new class of polymers from reactants consisting of diisocyanates and organo-phosphonic acids.

It is still a further object of this invention to provide polymers which are both heat stable and flame resistant.

These and other objects are accomplished by the following invention of polymeric phosphorus and nitrogen compounds containing in the polymer chain the recurring structural unit

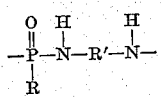

wherein R is a monovalent hydrocarbon radical of from 1 to 12 carbon atoms and R' is a divalent hydrocarbon radical of from 1 to 12 carbon atoms. Both hydrocarbon radicals as represented by R and R' may be either aromatic or aliphatic. When either or both of the radicals are aromatic, alkyl side chain substitution may be present; and when either or both radicals are aliphatic, the chain may be straight, branched or cyclic. The aliphatic radicals may be saturated or unsaturated.

The novel polymers of this invention are produced by reacting a phosphonic acid compound with a diisocyanate in accordance with the following reaction:

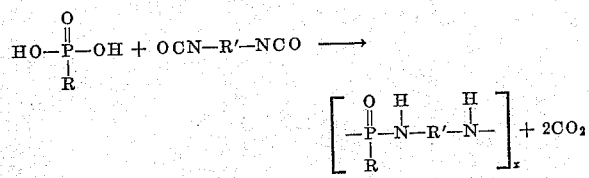

wherein R is a monovalent hydrocarbon radical containing from 1 to 12 carbon atoms which may be either aryl, arylalkyl, alkyl, alkylene or cycloalkyl; wherein R' is a divalent hydrocarbon radical containing from 1 to 12 carton atoms in which said hydrocarbon radical may be aryl, arylalkyl, alkyl, alkylene or cycloalkyl, and where x represents an integer of 2 or more.

Among the organo-phosphonic acids which may be employed in the practice of this invention are methane phosphonic acid, ethane phosphonic acid, propane phosphonic acid, isopropane phosphonic acid, butane phosphonic acid, isobutane phosphonic acid, heptane phosphonic acid, decane phosphonic acid, dodecane phosphonic acid, benzene phosphonic acid, p-toluene phosphonic acid, benzyl phosphonic acid, cyclopentane phosphonic acid, cyclohexane phosphonic acid, and others.

Among suitable diisocyanates which may be employed for the purposes of this invention are polymethylene diisocyanates, such as ethylene diisocyanate, trimethylene diisocyanate, tetramethylene diisocyanate, pentamethylene diisocyanate, hexamethylene diisocyanate, heptamethylene diisocyanate, octamethylene diisocyanate, etc.; alkylene diisocyanates, such as 1,4-diisocyanato butene-2; diisocyanatocycloalkanes, such as 1,3-diisocyanatocyclopentane, 1,3-diisocyanatocyclohexane, and 1,4-diisocyanatocyclohexane, aromatic diisocyanates, such as m-tolylene diisocyanate, o-phenylene diisocyanate, m-phenylene diisocyanate, p-phenylene diisocyanate; alkylarylene diisocyanates, such as γ,γ'-diisocyanato-p-xylene and mixtures thereof.

The diisocyanate and organo-phosphonic acid reactants are generally employed in substantially chemical equivalent quantities. However, in some instances it may be desired to produce a polymer of relatively low molecular weight, in which case, one or the other of the reactants may be employed in slight excess to act as a chain terminator.

The new polymers are preferably prepared by solution polymerization. That is, appropriate amounts of the phosphonic acid and diisocyanate of choice are first introduced into a suitable solvent for both reactants, for example, acetone and the like. The reaction is then allowed to proceed at a temperature in the range of from about 0° C. to 100° C., with satisfactory results being attainable at ambient temperatures. During the reaction carbon dioxide is evolved, and a gummy precipitate forms after about an hour of reaction time. The reaction mixture is then permitted to stand for a period of time, generally from about 6 to 12 hours, after which a hard, resinous product forms. The solvent may be removed from the polymer product by conventional procedures, i.e., by decanting, washing and then filtering. While a solution polymerization technique has just been described, the polymer may be formed by mass polymerization or by other polymerization techniques which are well known to the art.

Although the invention is primarily concerned with the production of polymers which have film and filament forming properties, the invention also includes the production of polymers of relatively low molecular weight which are useful in the manufacture of coating compositions, lacquers, and the like.

Filaments may be produced from the polymer by melt spinning, i.e., by extruding molten polymer through a spinneret into a cooling atmosphere. Filaments may also be produced by the conventional wet or dry spinning methods from solutions of the polymer.

In order to elucidate the present invention in greater detail, the following specific examples are presented. It is intended that these examples be considered as illustrative rather than limitative. Unless otherwise specified, the percentages given in the examples are in terms of weight.

Example I

In a glass flask of suitable size there was dissolved 3.16 grams (0.02 mol) of benzene phosphonic acid and 3.48 grams (0.02 mol) of m-tolylene diisocyanate in 25 ml. of acetone. The mixture was stirred at room temperature, approximately 25° C., until solution was complete. During the reaction carbon dioxide gas was evolved and a gummy precipitate formed in one hour. The mixture was allowed to stand overnight and a hard, resinous product formed. The acetone was decanted and the precipitate stirred with water and filtered. After washing the precipitate thoroughly with water it was then washed with acetone and dried. The polymeric product was a light tan powder weighing 4.18 grams (98.5% yield) which had a melting point of 205°–210° C. The polymer did not burn when melted in an open flame, and it was found that fibers could be spun from the melt.

Example II

Following the same procedure as described in Example I a second polymer was prepared by reacting 0.02 mol of benzene phosphonic acid and 0.02 mol of hexamethylene diisocyanate, both reactants being dissolved in acetone at room temperature. After thorough washing and drying of the resulting polymer it was found that the polymer had a melting point of 185°–190° C. and that fibers could be spun from the melt. The polymers were melted in an open flame without burning.

Although the invention has been described in detail with reference to preferred embodiments thereof, it will be understood that variations and modifications can be effected without departing from the spirit and scope of the invention as described hereinabove and as defined in the appended claims.

I claim:

1. A process for producing a synthetic linear polymer which comprises reacting together at a temperature in the range of from about 0° C. to 100° C. and in a substantially equimolecular quantities a mixture of a diisocyanate of the general formula $$OCN-R'-NCO$$

wherein R' is a divalent hydrocarbon radical containing from 1 to 12 carbon atoms, and an organo-phosphonic acid of the general formula

wherein R is a monovalent hydrocarbon radical containing from 1 to 12 carbon atoms.

2. A process of producing a synthetic linear polymer comprising reacting together at a temperature in the range of from about 0° C. to 100° C. and in substantially equimolecular quantities a mixture of benzenephosphonic acid and m-tolylene diisocyanate.

3. A process of producing a synthetic linear polymer comprising reacting together at a temperature in the range of from about 0° C. to 100° C. and in substantially equimolecular quantities a mixture of benzenephosphonic acid and hexamethylene diisocyanate.

References Cited in the file of this patent

UNITED STATES PATENTS

| | | |
|---|---|---|
| 2,268,586 | Gilman | Jan. 6, 1942 |
| 2,931,831 | Aries | Apr. 5, 1960 |

FOREIGN PATENTS

| | | |
|---|---|---|
| 1,243,608 | France | Sept. 5, 1960 |